United States Patent [19]
Lutz et al.

[11] 4,332,416
[45] Jun. 1, 1982

[54] VEHICLE ROOF

[75] Inventors: Alfons Lutz, Emmering; Walter Schätzler, Aufhausen; Hans Jardin, Inning; Werner Sielk, Erftstadt-Lechenich; Julius Frank, Cologne, all of Fed. Rep. of Germany

[73] Assignee: Webasto-Werk W. Baier GmbH & Co., Stuttgart, Fed. Rep. of Germany

[21] Appl. No.: 139,263

[22] Filed: Apr. 11, 1980

[30] Foreign Application Priority Data

Apr. 12, 1979 [DE] Fed. Rep. of Germany ....... 2914855

[51] Int. Cl.³ .............................................. B60J 7/10
[52] U.S. Cl. .................... 296/216; 296/222; 296/217
[58] Field of Search ............... 296/222, 216, 223, 224

[56] References Cited

U.S. PATENT DOCUMENTS

| | | | |
|---|---|---|---|
| 4,159,144 | 6/1979 | Ehlen et al. | 296/222 |
| 4,210,359 | 7/1980 | Mori | 296/222 |
| 4,223,942 | 9/1980 | DeLuca | 296/222 |
| 4,229,037 | 10/1980 | Vermeulen | 296/222 |
| 4,254,989 | 3/1981 | Schatzler | 296/216 |

Primary Examiner—Robert R. Song
Attorney, Agent, or Firm—Craig and Antonelli

[57] ABSTRACT

A vehicle roof with a roof aperture of the type having a parametric frame and a displaceable closure panel for opening and closing the aperture is formed through the use of a pre-assembled installation unit which is attachable to the frame and upon which the closure panel is mounted. The installation unit comprises all of the parts necessary for guiding and displacing the closure panel operationally associated with each other in a manner enabling complete testing of the drive for the displaceable closure panel without attachment of the installation unit to the aperture frame.

29 Claims, 10 Drawing Figures

VEHICLE ROOF

BACKGROUND AND SUMMARY OF THE INVENTION

The invention relates to a vehicle roof with a roof aperture surrounded by a frame and displaceably receiving a closure panel for opening and closing the aperture. In the conventional vehicle roofs of this type (see, for example, German Patent 2,016,492), the assembly of the sliding closure panel with its guide and drive elements is relatively expensive, since many individual parts per se must be mounted, in part, to the frame and, in part, to the closure panel. Another disadvantage of the conventional arrangements resides in that a functional testing is possible only once the top has been installed, because only then all individual components have been assembled.

Disadvantages of the aforementioned kind of vehicle roof are overcome in part by the arrangement disclosed in commonly assigned, copending U.S. application Ser. No. 10,468, filed Feb. 8, 1979, the co-inventors of which form part of the present application's inventive entity. More particularly, this commonly assigned application discloses an arrangement whereby the entire guide, actuation, and displacement mechanism for a sliding closure panel can be prefabricated so that the work involved in installing the arrangement in the vehicle roof itself can be reduced.

The present invention is intended as a further development beyond that disclosed in said co-pending application, and has as objects the providing of a vehicle roof of the aforementioned kind wherein the expenditure for the mounting of the sliding top is further reduced and which also permits a functional testing of the drive means for the top prior to installation.

These objects have been achieved according to a preferred embodiment of the invention by its various features as disclosed herein.

By means of arrangements as proposed in accordance with the preferred embodiment of the invention, the installation of the sliding roof on the assembly line of the vehicle manufacturer becomes extremely simple, since, after providing the roof aperture and the frame, the preassembled installation unit need merely be placed into the frame and attached thereto with screws. Since this installation unit contains all of the functional parts of the sliding roof, the testing of its functioning can take place prior to installation. Thereafter, it is merely necessary to insert the top, connect same with screws to the installation unit, and thereby adjust same in its height to attain alignment thereof with the fixed roof part in the closed position.

The guide channels for the cables in the zone of the front edge of the roof aperture are frequently constituted by tubes, and in the region of the center of the front edge, a hand crank with a pinion is provided, in engagement with the cables. In such a vehicle roof, the tubes can be attached, according to the present invention, in the zone of the front edge of the roof aperture to a cover extending over the width of the frame, which cover is connected to the forward ends of the lateral guide rails, whereas the rear gutter is pushed onto the guide rails. Thereby, the installation unit has the shape of a stable quadrangle which can be readily transported without there being the danger of disintegration or bending of this unit. Since the rear gutter is normally guided in the guide rails receiving the sliding blocks, and thus the guide rails are fixed only toward the inside and toward the outside by the gutter, simple synthetic resin clamping members can be provided for purposes of transportation, which are clamped to the gutter and retain the rails, and which are removed after assembly.

The tubes can be clipped onto the cover. It is the most simple procedure to manufacture the cover of a synthetic resin and to provide ribs on its underside, which ribs are provided with corresponding recesses for the tubes, and the tubes can be pressed into these recesses.

The pinion is preferably mounted in a plate attached or clipped to the cover.

Since the rear gutter must be shifted together with the top, but must be movable relatively to the top in case of vehicle roofs wherein the top is not only rearwardly displaceable but can also be swung out with its rear edge upwardly past the fixed roof, for the reason that this rear gutter cannot participate in the swinging-out motion of the top, it is advantageous to connect each of the ends of the rear gutter by means of a respective rod to the respective forward sliding block carrier. Inasmuch as the top, during its swinging-out motion, is pivoted about an axis extending approximately through the two forward sliding block carriers, there is no shifting of the rear gutter in this type of articulation, whenever the top is swung out.

A significant simplification of the structure of the assembly unit is obtained if the guide rails and the guide channels extending along a lateral edge of the roof aperture are formed by a joint rolled sheet metal profile. It is known to construct a guide rail and guide channel from a single light metal extruded section. However, such an extruded part is expensive in its manufacture and is also relatively heavy. Besides, such a part is subjected to increased abrasion, particularly by the threaded cables. In contrast thereto, a rolled sheet metal part can be produced more simply and more cheaply; it has a lower weight and furthermore shows a significantly lesser abrasion due to the higher strength of the material.

To facilitate mounting of the top to the installation unit, it is extraordinarily advantageous to connect, on each side of the top, the forward sliding block carrier to the part of the swing-out element on the top side by means of a rail, the top being attached to this rail with screws. Thereby these parts, which must be connected to the top but initially are present in the loose form, are fixed in their mutual position. In this connection, it is to be noted expressly that this suggestion is not limited to a vehicle roof with the installation unit of this invention, but can also be utilized advantageously in vehicle roofs lacking such an installation unit, because this feature eliminates the otherwise necessary individual mounting of the forward sliding block carrier and of the part of the swing-out element on the side of the top, to be performed for each side of the top, and accordingly, the assembly work is considerably reduced.

Preferably, the aforementioned rail consists of a synthetic resin wherein the forward sliding block carrier, as well as the part of the swing-out element on the top side are cast into the synthetic resin or are molded thereto. Therefore, suitably the part of the swing-out element on the top side forms part of the rail. In a customary swing-out mechanism, for example, according to German Pat. No. 2,016,942, the sliding slot serving for the lowering of the rear end of the top from the closed position prior to the backward sliding of the top is thus arranged directly in the rail. The stability of the mounting of the top to the rail can be significantly increased by providing that the mounting points are in different vertical planes. Preferably, three mounting locations are provided which, as seen from above, are at the corners of a triangle. The central mounting point can be constituted by a projecting extension of the rail. In such a triangular arrangement the danger of a twisting of the simple metal fishplates attached to the top and screwed onto the rails is considerably reduced.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
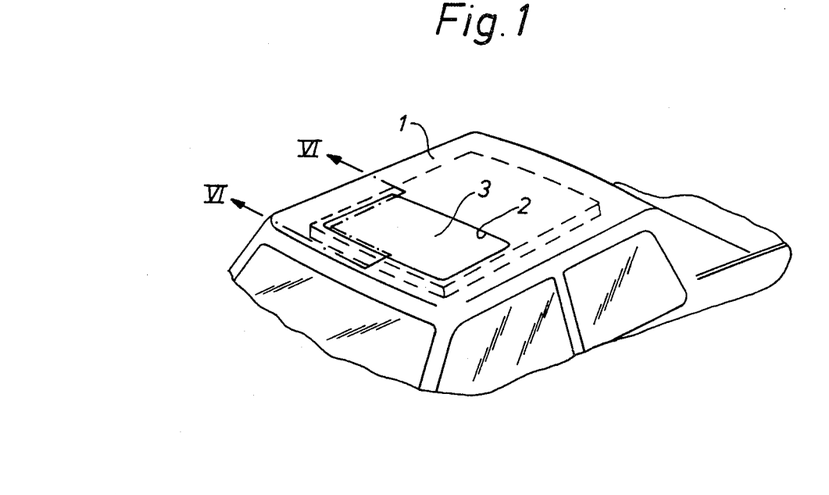
FIG. 1 is a perspective view of a roof for an automotive vehicle.

FIG. 1 shows the roof for an automotive vehicle, denoted by 1, comprising a rectangular roof aperture 2 closed by a closure panel 3, which closure panel can be selectively swung out with its rear edge past the fixed roof part to provide ventilation for the interior of the vehicle, or which can be pushed rearwardly underneath the fixed roof part.

Figure 2:
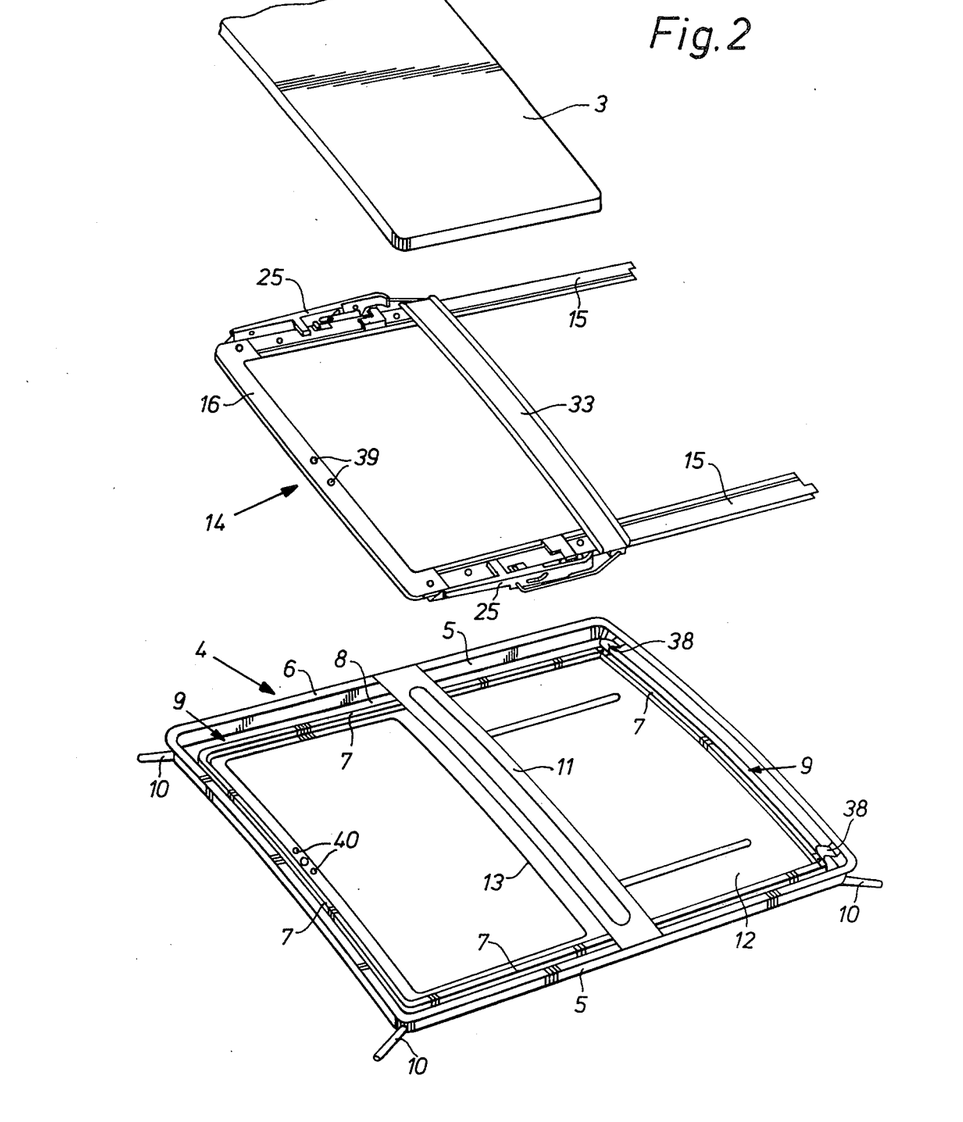
FIG. 2 is an exploded perspective view of the individual parts of the sliding roof, consisting of the sliding roof frame, the installation unit, and the sliding top.

The roof aperture 2 is surrounded by a frame 4 which can best be seen from FIG. 2. The frame 4 has a vertical outside wall 5 surrounded by a flange 6, the latter being attached to the fixed roof 1, for example, by welding. An upwardly projecting bead 7 defines, with the outside wall 5 and the bottom 8 of the frame 4, a gutter 9 extending around the entire periphery of the frame 4; water, which has entered, is drained from this gutter via short pipes 10 extending in the columns of the automotive vehicle. A reinforcing cross member 11 connects the lateral edges of the frame approximately in the middle of the latter. The frame 4 has a bottom plate 12 provided with a cutout 13 corresponding to the roof aperture 2.

Figure 3:
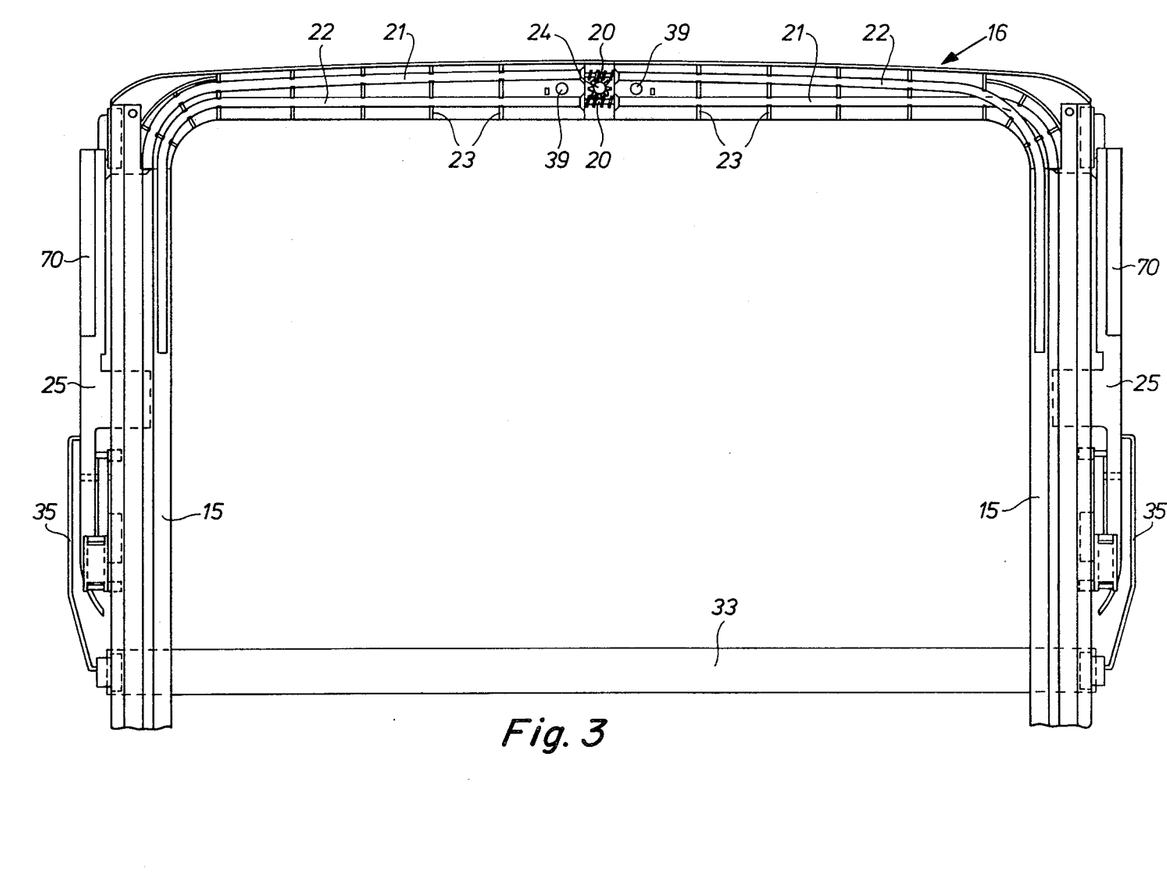
FIG. 3 is a view of the installation unit from below.
Figure 6:
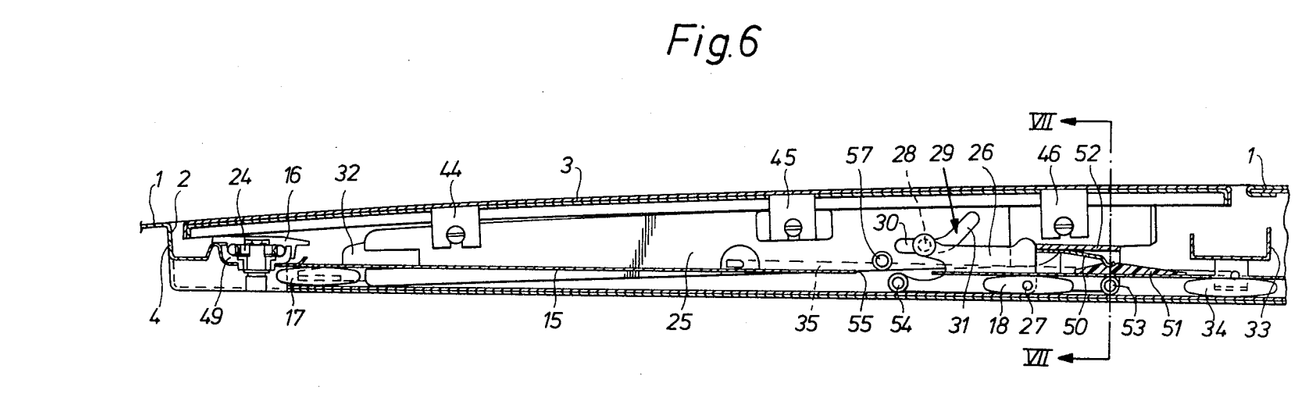
FIG. 6 is a section along line VI—VI in FIG. 1.

The top 3 is arranged in an installation unit 14 (FIG. 2) carrying all of the elements required for the guidance and operation of the top 3. This installation unit consists of lateral guide rails 15, the front ends of which are joined together by a cover 16. As can be seen from FIG. 7, in particular, each guide rail 15 has a guide 15a that is C-shaped in cross section, wherein the top 3 is guided by way of forward sliding blocks 17 and rearward sliding blocks 18 (FIG. 6). In addition, each guide rail 15 comprises a guide channel 19 for a pressure-stable drive cable 20 engaging the rearward sliding block 18; this cable can be driven by a crank mechanism in the center of the front edge of the roof aperture 2 or by means of an electric motor. Each of the two rearward sliding blocks 18 is connected to the drive mechanism via its own threaded cable 20. These threaded cables 20 are extended in the zone of the front edge of the roof aperture 2 in tubes 21 terminating directly into the channels 19 in the guide rails 15. The tubes 21 are attached to the underside of the cover 16 by being forced into recesses in ribs 23, projecting in the downward direction from the cover 16 (FIG. 3). In the center of the cover 16, the two cables 20 are in engagement with a pinion 24 which can be operated by a crank, not shown. The free ends of the threaded cables 20 are guided in tubes 22 which are clipped, just as the pipes 21, to the cover 16.

The guide rail construction noted in the preceding paragraph with integral sliding block and cable receiving formations represents a departute from the arrangement disclosed in Serial No. 10,468 in that it facilitates achievement of a prefabricated unit that can be operationally tested prior to installation.

The forward sliding blocks 17 and the rearward sliding blocks 18 are connected on each side of the top by a shield 25. The connection between the rearward sliding block 18 and the shield 25 is effected by means of a swing-out lever 26 rotatably joined to the sliding block 18 via an axle 27 and engaging, with a pin 28, into a sliding slot 29 provided in the shield 25 (FIG. 6). The sliding slot 29 has two sections 30 and 31 extending at an angle with respect to each other, the function of which will be described further below. The connection between the shield 25 and the forward sliding block is achieved, in the embodiment, with the aid of a metallic sliding block carrier 32 which is cast into the shield 25, which latter consists of a synthetic resin, and is pushed onto the sliding block 17. The shields 25 seal, when the top 3 is swung out, the wedge-shaped gap between the top and the roof, whereby noise evolution is diminished and the outward appearance is improved.

The installation unit 14 is completed by a rear gutter 33 guided by way of sliding blocks 34 in the same guides 15a as the sliding blocks 17 and 18; on each side this rear gutter is connected by means of a rod 35 to the shield 25 approximately in the center of the latter. The bent end of the rod 35 is clipped into an opening 36 (FIG. 5) of the shield 25. The connection of the front ends of the rails 15 to the cover 16 can be accomplished, for example, by cementing, especially if the cover 16 is made of a synthetic resin.

Figure 10:
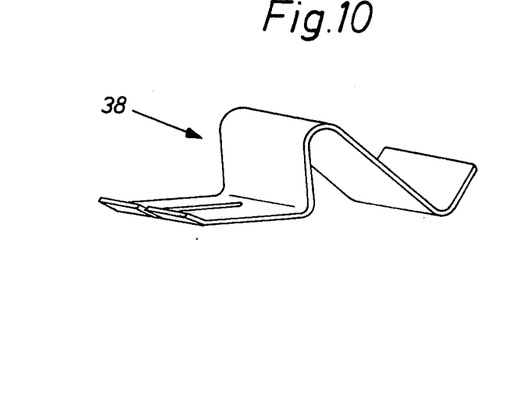
FIG. 10 shows a retaining spring for the installation unit on an enlarged scale.

The complete installation unit 14 is, therefore, composed of the two lateral guide rails 15, the front cover 16, the rear gutter 33, the forward and rearward sliding blocks 17 and 18 connected with each other by the shields 25 and inserted in the guides 15a, as well as the cables 20 introduced into their guide channels 19 or the tubes 21 and 22, these cables being joined to the rearward sliding blocks 18 at their rear ends. This complete installation unit can be preassembled, tested for its functioning, and, after attaching the frame 4 to the vehicle roof 1, can be inserted in the interspace between the frame 4 and the vehicle roof 1. In this connection, the lateral guide rails 15 are placed on the lateral sections of the continuous bead 7 and are attached to this bead by means of screws extending through holes 37 in the guide rails 15. The rear ends of the guide rails 15 are held by clips 38, one of which is shown in FIG. 10 in a perspective view; these clips are attached to the ends of the lateral sections of the bead 7, as can be seen from FIG. 2. The mounting of the installation unit 14 along its front edge is effected by screws, with which a collar 49 (FIG. 6) carrying the drive pinion 24 is attached to the frame 4, these screws extending through holes 39 in the cover 16 and through holes 40 in the frame 4 and being threaded into screw holes of a handle dish, not shown.

Since the installation unit 14 contains all of the drive and moving mechanisms for the top 3, these mechanisms can be tested for their operability prior to insertion of the installation unit 14.

Figures 4, 5:
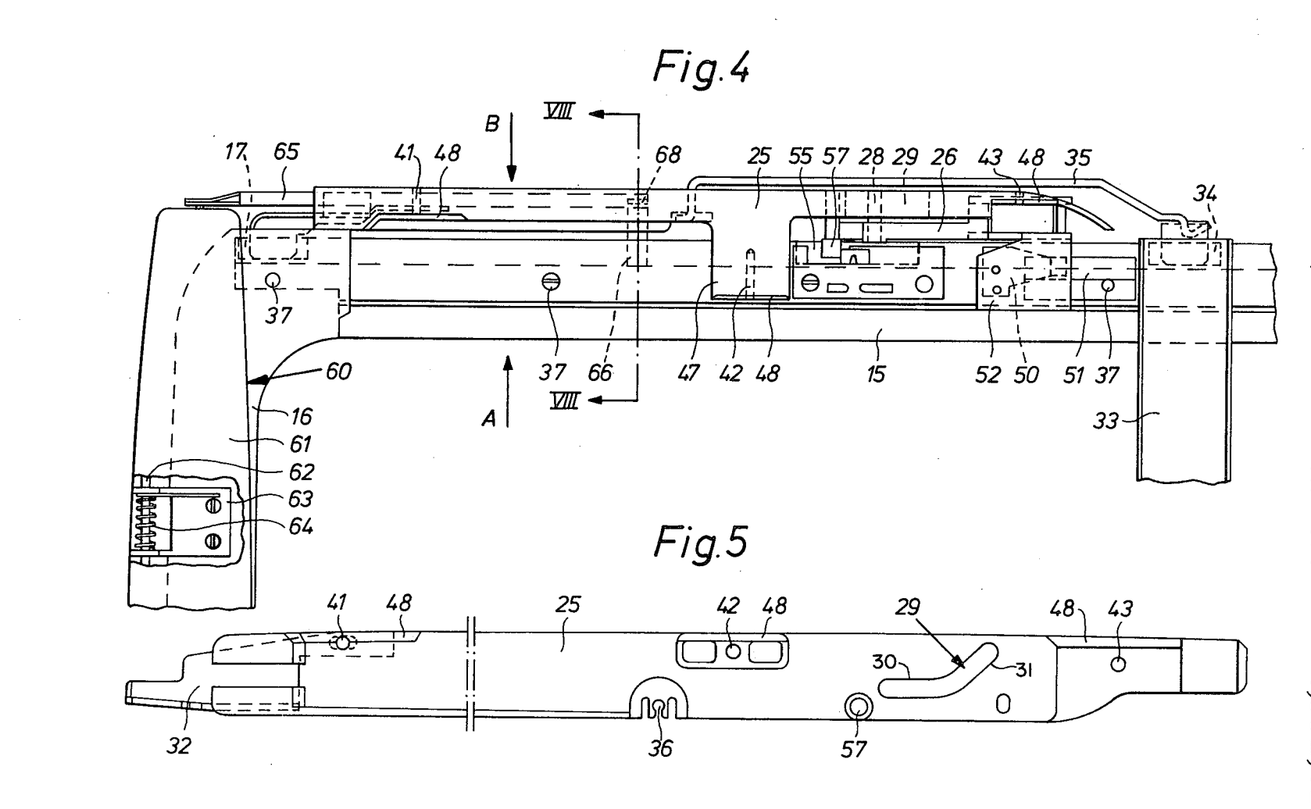
FIG. 4 is a partial view of the installation unit from above.
FIG. 5 is a lateral view of a side shield of the installation unit in the direction of arrow A in FIG. 4.

After the installation unit 14 has been put in place and attached by screws, the top 3 is fastened to the installation unit 14. For this purpose, three mounting points 41, 42, and 43 are provided at the lateral shield 25, to which the top 3 can be attached by means of screws with corresponding, downwardly extending fishplates 44, 45, and 46. The mounting locations 41, 42, and 43 are not disposed in a common plane, as shown in FIG. 4, whereby the stability of the mounting of the top 3 at the shield 25 is considerably enhanced. The central mounting point 42 is arranged, as shown in FIG. 4, at a projecting extension 47 of the shield 25.

The top 3 is thus merely placed on the installation unit, and the fishplates 44, 45, and 46 are connected with screws on each side of the top 3 to the respective shield 25. To facilitate the insertion of the fishplates 44-46, the top edge of the shield 25 can be beveled in the zone of the mounting points 41, 42, and 43, as indicated at 48 in FIGS. 4 and 5.

In order to ensure the correct positioning of the two rearward sliding blocks 18 relatively to each other prior to installation of the top 3, a detent is provided for each rearward sliding block 18 on its guide rail 15, this detent comprising a spring 50 connected to the rearward sliding block 18. This spring can lock into a notch in a supporting element 51 mounted to the guide rail 15 in the position corresponding to the closed condition of the top 3.

Figure 7:
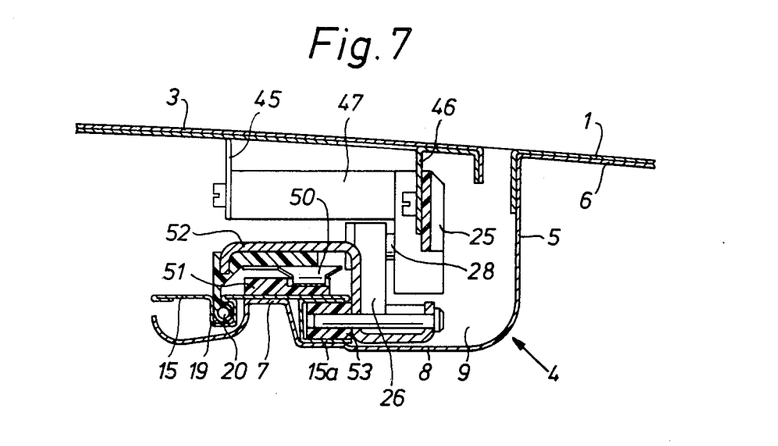
FIG. 7 is a section along line VII—VII in FIG. 6.

In the embodiment, and illustrated particularly in FIG. 7 in conjunction with FIG. 6, the threaded cable 20 is connected to the sliding block 18 via a slide 52, which slide extends through a longitudinal slot of the cable guide channel 19, traverses the etire guide rail 15, and is connected on the other side of the bead 7 with the rearward sliding block 18. For stabilizing purposes, the slide 52 is provided with a roller 53 lying in the guide 15a of the guide rail 15.

Figure 8:
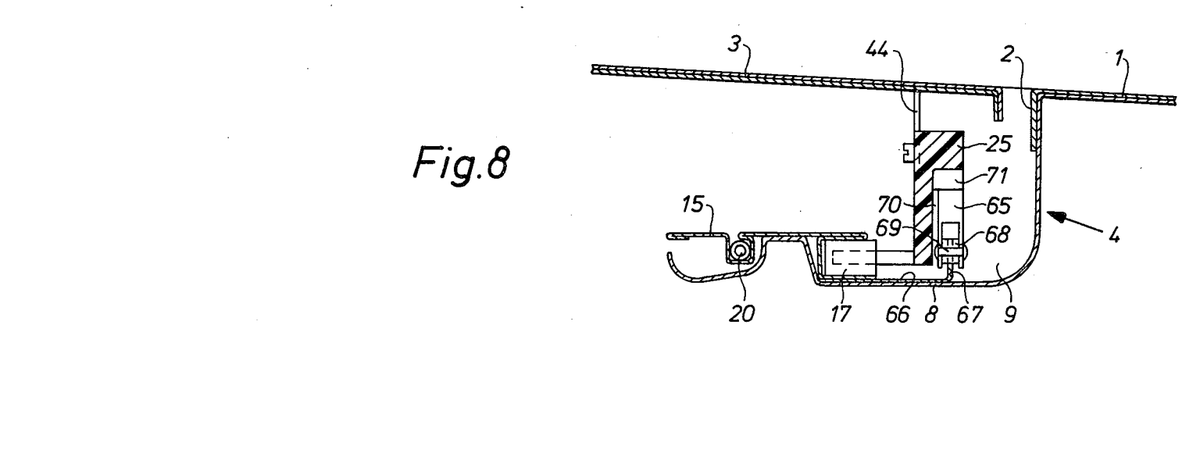
FIG. 8 is a section line VIII—VIII in FIG. 4.
Figure 9:
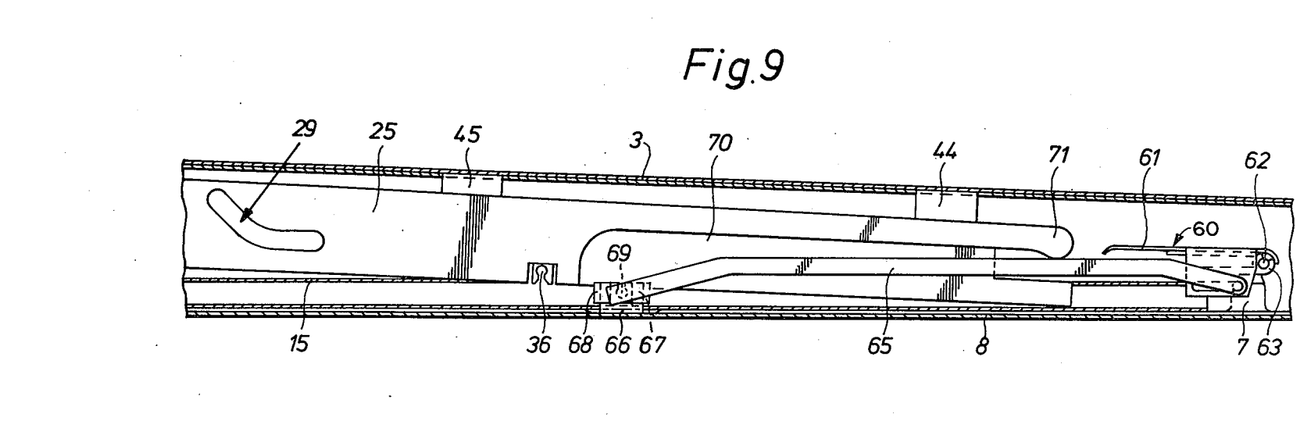
FIG. 9 is a lateral view in the direction of arrow B in FIG. 4.

In some cases the arrangement of a wind deflector is desirable. Such a wind deflector 60 is shown in FIGS. 4, 8, and 9. This deflector can be readily integrated into the installation unit 14 by mounting its blade 61 by means of an axle 62 in bearing blocks 63 attached with screws to the front cover 16. On each end of the blade 61, a lever 65 is rotatably mounted, this lever being supported with its free end in a rotatable fashion on the lateral guide rail 15. For this purpose, an extension 66 is provided at the rail 15, this extension 66 having an upwardly projecting end 67 on which a bearing block 68 can be placed receiving the rotary axle 69 of the lever 65. The lever 65 is disposed in a recess 70 in the outer lateral surface of the shield 25, when the top 3 is in its closed position. The blade 61 is brought into the deflected position by springs 64 once the top 3 has been retracted. Upon a forward displacement of the top 3 into its closed position, the blade 61 is automatically placed into the inwardly pivoted position, by the feature that a lug 71 on the shield 25 slides onto the lever 65 and pivots the latter about its rotational axle 69 in the downward direction. Alternatively, the extension 66 could also be attached to the frame 4. This would increase the expenditures for assembly only to an insubstantial extent, since the subsequent placing of the bearing block 68 onto the end 67 is insignificant.

The function of the swing-out mechanism will be briefly described hereinbelow; by means of this mechanism the rear edge of the top 3 can either be swung out or lowered for the purpose of pushing the top backwards underneath the fixed roof part 1. This swing-out mechanism consists in principle of two parts movable relatively to each other, namely a part on the side of the top, constituted in the embodiment by the sliding slot 29 in the shield 25, and a part on the side of the frame or roof, embodied by the swing-out lever 26. As mentioned previously, the swing-out lever 26 is connected to the sliding block 18 and is provided with a pin 28 engaging into the sliding slot 29.

The sliding slot 29 has a first section 30 extending approximately in parallel to the top 3, and a second section 31 extending at an angle rearwardly and in the upward direction. In the position shown in FIG. 6 the top 3 is in its closed position. If now the rear edge of the top 3 is to be swung out, the rearward sliding blocks 18 and the swing-out levers 26 connected therewith will be shifted toward the left by a corresponding movement of the threaded cables 20 in FIG. 6, until each pin 28 contacts the end of the sliding slot section 30. Upon a further movement of the rearward sliding block in the forward direction, i.e. toward the left in FIG. 6, the lever 26 is placed in an upright position whereby the rear edge of the top 3 is lifted. The front end of the top 3 is held by the forward sliding blocks 17. To lower the rear edge of the top, each rearward sliding block 18 is shifted via the threaded cables 20 in FIG. 6 toward the right, whereby initially each swing-out lever 26 is pivoted in the downward direction until it enters with a roller 54 arranged at its front end into the guide 15a of the guide rail 15. This inward pivoting motion is made possible by a cutout 55 in the top end plate of the guide 15a. The top 3 is entrained by the swing-out lever 26 until the latter has reached the position shown in FIG. 6. If now the top 3 is to be pushed rearwardly underneath the fixed roof part, then the rearward sliding blocks 18 are moved further toward the right by means of the threaded cables 20 in FIG. 6, whereby now the sliding pin 28 passes into the zone of the second sliding slot section 31. Since the swing-out lever 26 can no longer rise, due to the fact that its roller 54 is now located underneath the upper end plate of the guide 15a, the shield 25 and, with it, the top 3 are pulled downwardly, and during this procedure a roller 57 arranged at the shield 25 can enter the guide 15a through the aforementioned cutout 55. The top 3 is then lowered to such a degree that it can be pulled without difficulties underneath the fixed roof part 1, if the rearward sliding block 18 is moved further toward the right.

A significant simplification as compared to the conventional construction, also applicable to sliding roofs or sliding-lifting roofs of another construction, is to be seen in the novel structure of the lateral guide rails 15 which, according to the invention, consist of a single rolled sheet metal profile containing the guide channel for the drive cable as well as the guide means for the sliding blocks. Such a profile has a very low weight and yet, as compared with extruded aluminum profiles, exhibits a high strength affording a reduction in abrasion by the drive cable. Also, the connection of the forward sliding block 17 or sliding block carrier 32 to the part 29 of the swing-out element on the top side by means of the rail or shield 25 is of general importance. Thereby an individual mounting of these parts to the top is avoided and consequently even if no complete installation unit is provided, as in the illustrated embodiment, the assembly work is considerably reduced.

The proposed construction makes it possible to utilize selectively roofs of an opaque or transparent or translucent material since, due to the arrangement of the mounting points 41, 42, and 43 outside of the cutout 13 of the frame 4, the free view is not impaired by the mounting points While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A vehicle roof with a roof aperture, a frame mounted to said roof and surrounding said aperture, a displaceable closure panel for opening and closing said aperture, and a pre-assembled installation unit which is attachable to said frame and upon which said closure panel is mountable, said installation unit comprising longitudinal guides, a cross-piece interconnecting said guides at a forward end thereof, closure panel support means slideable along said guides for supporting said closure panel for pivotal displacement about a transverse axis and for longitudinal displacement along said guides, cable drive means connected between said cross-piece and said support means for producing said displacement, and a rear gutter mounted for longitudinal displacement along said guides with said support means, all of which are operationally associated with each other in a manner enabling complete testing of said cable drive means without attachment of said installation unit to said frame.

2. A vehicle roof according to claim 1, wherein said frame includes gutters extending along front and side edges of said aperture, said guides are guide rails in which forward and rear slide blocks forming part of said closure panel support means are received, and said cable drive means comprises threaded cables displaceably guided within guide channels.

3. Vehicle roof according to claim 2, characterized in that the installation unit is attached with screws to an upwardly projecting bead of the frame, said bead defining the front, rear, and side gutters; and that spring clips are provided at rear end portions of said bead which define the side gutters, each said spring clip serving for holding the end of a respective one of said guide rails of the installation unit.

4. Vehicle roof according to claim 2 or 3, characterized in that the guide channels for the threaded cables are constituted in a zone of the front edge of the roof aperture by tubes and in a zone of the lateral edges of the aperture by channels formed in the guide rails; that the tubes are attached to said cross-piece which extends over the width of the frame.

5. Vehicle roof according to claim 3, characterized in that the tubes are clipped onto the cross-piece.

6. Vehicle roof according to claim 4, comprising a drive pinion mounted in the center of the front edge of the roof aperture, and characterized in that the pinion is supported in a plate that is attached to the cross-piece.

7. Vehicle roof according to claim 2, characterized in that ends of the rear gutter are connected by a respective rod to a carrier for a respective forward sliding block.

8. Vehicle roof according to claim 2, characterized in that the guides and portions of the guide channels extending along the side edges of the roof aperture are unitarily formed by a rolled sheet metal part.

9. Vehicle roof, especially according to claim 2, wherein the forward sliding block on each side of the closure panel is connected to the closure panel by means of a carrier that is connected to a lateral shield forming part of the support means, the closure panel being attached with fasteners to the lateral shields.

10. Vehicle roof according to claim 8, characterized in that each lateral shield is provided with a sliding slot within which a swing-out element, forming a further part of said support means, is displaceably received.

11. Vehicle roof according to claim 9 or 10, characterized in that each lateral shield is made of a synthetic resin, and that a respective forward sliding block carrier as well as the sliding slot are cast or molded therein.

12. Vehicle roof according to claim 9 or 10, characterized in that the mounting points of the closure panel to said lateral shield are disposed in different vertical planes.

13. Vehicle roof according to claim 12, characterized in that three mounting points are provided which, as seen from above, are at the corners of an imaginary triangle.

14. Vehicle roof according to claim 9, characterized in that ends of the rear gutter are joined by a respective rod to a central zone of a respective lateral shield.

15. Vehicle roof according to claim 10, characterized in that the closure panel is provided with downwardly oriented fishplates for mounting to said lateral shields and that a top edge of the lateral shields, in a zone of the mounting to said fishplates, is beveled.

16. Vehicle roof according to claim 12, characterized in that the frame has a cutout corresponding to the roof aperture and said mounting points are located outside of the perimeter of said cutout.

17. Vehicle roof according to one of claims 1 or 2 or 3, in that a wind deflector is mounted at the installation unit.

18. Vehicle roof according to one of claims 9, or 10, or 14, or 15, in that a wind deflector is mounted at the installation unit.

19. Vehicle roof according to claim 18, characterized in that the wind deflector has a pivotable blade which is attached in a rotatable manner to the closure panel so as to extend in parallel to the front edge of the roof aperture, said blade comprising, at its ends, rearwardly extending levers which, when the closure panel is in its position closing said aperture, lie in recesses in the lateral shields.

20. Vehicle roof according to claim 19, characterized in that each lateral shield has a lug which is constructed to act on a respective lever for producing an inward pivoting of the blade as said closure panel is displaced toward its position closing said aperture.

21. Vehicle roof according to claim 19, characterized in that each lever is rotatably supported, at its end facing away from the blade, on a respective guide rail.

22. Vehicle roof according to claim 2 or 8 wherein said guide channels comprise U-shaped portions of said guide rails and said slide blocks are received in outwardly facing C-shaped portions of said guide rails.

23. An installation unit for attachment to a frame mounted within a vehicle roof aperture and to which a closure panel for opening and closing said aperture is mountable, said installation unit comprising longitudinal guides, a cross-piece interconnecting said guides at a forward end thereof, closure panel support means slidable along said guides for supporting said closure panel for pivotal displacement about a transverse axis and for longitudinal displacement along said guides, cable drive means connected between said cross-piece and said support means for producing said displacement, and a rear gutter mounted for longitudinal displacement along said guides with said support means, all of which are operationally associated with each other in a manner enabling complete testing of said cable drive means without attachment of said installation unit to said frame.

24. An installation unit according to claim 23, wherein said guides are guide rails in which forward and rear slide blocks are received, and said cable drive means comprises threaded cables displaceably guided within said guide channels.

25. An installation unit according to claim 24, wherein ends of a the rear gutter are pivotally connected by a respective rod to a carrier for a respective forward sliding block.

26. An installation unit according to claim 24, wherein the forward sliding block on each side of the closure panel is connected to the closure panel by means of a carrier that is connected to a lateral shield forming part of the support means, the closure panel being attached with fasteners to the lateral shields.

27. An installation unit according to claim 26, wherein each lateral shield is provided with a sliding slot within which a swing-out element, forming a further part of said support means, is displaceably received.

28. An installation unit according to claim 26, characterized in that ends of the rear gutter are joined by a respective rod to a central zone of a respective lateral shield.

29. An installation according to claim 23, or 24, or 26, further comprising a wind deflector mounted in the vicinity of said cross-piece.

* * * * *